US012066121B2

(12) United States Patent
Leys et al.

(10) Patent No.: US 12,066,121 B2
(45) Date of Patent: Aug. 20, 2024

(54) ELECTROSTATIC DISCHARGE MITIGATION VALVE

(71) Applicant: ENTEGRIS, INC., Billerica, MA (US)

(72) Inventors: John A. Leys, Chaska, MN (US); JaeHan Shim, Wonju-si (KR)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 17/732,136

(22) Filed: Apr. 28, 2022

(65) Prior Publication Data

US 2022/0349488 A1 Nov. 3, 2022

Related U.S. Application Data

(60) Provisional application No. 63/182,503, filed on Apr. 30, 2021.

(51) Int. Cl.
*F16K 25/00* (2006.01)
*F16K 7/16* (2006.01)

(52) U.S. Cl.
CPC .............. *F16K 25/005* (2013.01); *F16K 7/16* (2013.01)

(58) Field of Classification Search
CPC ........... F16K 25/005; F16K 7/16; F16K 7/126
See application file for complete search history.

(56) References Cited

U.S. PATENT DOCUMENTS 9,995,415 B2 * 6/2018 Imai ........................ F16L 9/125
2004/0261850 A1 12/2004 Maula et al.
2005/0263935 A1 12/2005 Aisenbrey
2007/0241301 A1 * 10/2007 Wincek .................. F16K 7/126 251/285
2012/0068102 A1 * 3/2012 Anagnos .................. F16K 7/16 251/366
2014/0021392 A1 * 1/2014 Matalon .................. F16K 7/126 251/175
2015/0129791 A1 5/2015 Okita et al.
2022/0163137 A1 * 5/2022 Ebihara ................ F16K 41/103

FOREIGN PATENT DOCUMENTS

JP 2019184063 A * 10/2019 ........... F16K 41/103
KR 20200028293 A 3/2020
KR 20210023745 A 3/2021
TW 201104948 A 2/2011

* cited by examiner

*Primary Examiner* — Patrick C Williams

(57) ABSTRACT

This disclosure provides operative components that mitigate electrostatic charge in fluid circuits. Illustrative embodiments include diaphragm valves that provide fluid control and allow static charge to dissipate when these diaphragm valves are grounded.

9 Claims, 7 Drawing Sheets

ELECTROSTATIC DISCHARGE MITIGATION VALVE

TECHNICAL FIELD

Embodiments of the present disclosure are directed to fluid handling systems, and more specifically, to operative components used in ultra-pure fluid handling systems with electrostatic discharge mitigation.

BACKGROUND

Fluid handling systems offering high purity standards have many uses in advanced technology applications. These applications include processing and manufacturing of solar panels, flat panel displays, and in the semiconductor industry for applications such as photolithography, bulk chemical delivery, chemical mechanical polishing (CMP), wet etch, and cleaning. Certain chemicals used in these applications are particularly corrosive, precluding the use of some conventional fluid handling technology because of possible corrosion of the fluid handling components and leaching of chemicals into the environment.

In order to meet the corrosion resistance and purity requirements for such applications, fluid handling systems provide tubing, fittings, valves, and other elements, that are made from inert polymers. These inert polymers may include, but are not limited to, fluoropolymers such as tetrafluoroethylene polymer (PTFE), perfluoroalkoxy alkane polymer (PFA), ethylene and tetrafluoroethylene polymer (ETFE), ethylene, tetrafluoroethylene and hexafluoropropylene polymer (EFEP), and fluorinated ethylene propylene polymer (FEP). In addition to providing a non-corrosive and inert construction, many fluoropolymers, such as PFA, are injectable, moldable and/or extrudable.

Electrostatic discharge (ESD) is an important technical issue for fluid handling systems in the semiconductor industry and in other technology applications. Frictional contact between fluids and surfaces of various operational components (e.g. tubing or piping, valves, fittings, filters, etc.) in the fluid system can result in generation and buildup of static electrical charges. The extent of charge generation depends on various factors including, but not limited to, the nature of the components and the fluid, fluid velocity, fluid viscosity, electrical conductivity of the fluid, pathways to ground, turbulence and shear in liquids, presence of air in the fluid, and surface area. These properties, and ways to mitigate the undesired static electrical charge caused by these properties, are discussed and reported in NFPA 77, "Recommended Practice on Static Electricity", pp. 77-1 to 77-67, 2014.

Further, as the fluid flows through the system, the charge can be carried downstream in a phenomenon called a streaming charge, where charge may buildup beyond where the charge originated. Sufficient charge accumulations can cause ESD at the tubing or pipe walls, component surfaces, or even onto substrates or wafers at various process steps.

In some applications, semiconductor substrates or wafers are highly sensitive to static electrical charges and such ESD can result in damage or destruction of the substrate or wafer. For example, circuits on the substrate can be destroyed and photoactive compounds can be activated prior to regular exposure due to uncontrolled ESD. Additionally, built up static charge can discharge from within the fluid handling system to the exterior environment, potentially damaging components in the fluid handling system (e.g. tubing or piping, fittings, components, containers, filters, etc.), that may lead to leaks, spills of fluid in the system, and diminished performance of components. In these situations, such discharge, may lead to potential fire or explosion when flammable, toxic and/or corrosive fluids are used in the compromised fluid handling system.

In some fluid handling systems, to reduce the buildup of static charges, certain metal or conductive components in fluid handling system are grounded to mitigate the buildup of static charge in the system as it continually disperses from the metal or conductive components to ground. Conventional use of multiple grounding straps may lead to undue mechanical clutter in a fluid handling system, and may lead to a complex grounding system network requiring extensive maintenance or a complex system that may lead to undesirable contamination, corrosion, or failure of the system.

It would be desirable to improve ESD mitigation in ultra-pure fluid handling systems for improved component performance and reduction in potentially damaging ESD events.

SUMMARY

One or more embodiments of this disclosure are related to an operative component for a fluid circuit comprising a housing having i) one or more fluid intake fitting, ii) one or more fluid output fitting, and iii) one or more fluid control component, wherein the fluid control component comprises a conductive fluoropolymer to transfer static charge from the fluid control component to ground. An exemplary embodiment is a valve controlling fluid flow from the intake fitting to the output fitting of the operative component.

In certain embodiments, the operative component comprises a diaphragm valve having a flexible fluoropolymer body to control fluid flow from the intake fitting to the output fitting. In selected embodiments, the flexible fluoropolymer body comprises a conductive fluoropolymer that may be either, for example, an conductive composite fluoropolymer forming the flexible fluoropolymer body being substantially conductive throughout or over all the structure of the flexible body, or a conductive fluoropolymer segment around the perimeter of a non-conductive flexible fluoropolymer body forming a flexible fluoropolymer body with a conductive composite fluoropolymer perimeter segment and a non-conductive fluoropolymer region within this perimeter segment.

Suitable fluoropolymers for the disclosed diaphragm valve include, but are not limited to, perfluoroalkoxy alkane polymer (PFA), ethylene and tetrafluoroethylene polymer (ETFE), ethylene, tetrafluoroethylene and hexafluoropropylene polymer (EFEP), fluorinated ethylene propylene polymer (FEP), tetrafluoroethylene polymer (PTFE), or combinations thereof. In certain embodiments, a suitable polymer for the diaphragm valve comprises tetrafluoroethylene polymer loaded with conductive material. In certain embodiments, these fluoropolymers are loaded with carbon black in ranges of about 0.1-10 wt %, preferably about 1-7 wt %, or more preferably about 3-5 wt %.

In some embodiments, the disclosed diaphragm valve comprises perfluorinated ionomer particles that are blended with a non-conductive fluoropolymer to form a composite including a non-conductive fluoropolymer matrix and regions of perfluorinated ionomer distributed within the non-conductive fluoropolymer matrix. The regions of perfluorinated ionomer within the non-conductive fluoropolymer matrix impart electrostatic dissipative properties to the resultant composite. An example of a suitable perfluorinated ionomer is a perfluorosulfonic acid (PFSA) polymer having a poly(tetrafluoroethylene) backbone with perfluoroether pendant side chains terminated by sulfonic acid groups is commercially available as NAFION™ ionomer (NAFION™ is a trademark of The Chemours Company). Additional examples of commercially available perfluorinated ionomers include, but are not limited to, FLEMION® (Asahi Glass Company), ACIPLEX® (Asahi Kasei), or FUMION® F. (FuMA-Tech) ionomers. Perfluorinated ionomers for use in electrostatic dissipative systems are reported in U.S. Pub. No. US 2020/0103056 A1, the entirety of which is incorporated herein by reference for all purposes.

In other embodiments of this disclosure are related to diaphragm valve for a fluid circuit comprising two or more housing components, one or more intake fitting, one or more output fitting, and a diaphragm; wherein the diaphragm comprises a flexible conductive fluoropolymer body to transfer static charge from the diaphragm to ground. The flexible fluoropolymer body, for example, comprises a conductive fluoropolymer that may be either, for example, a conductive composite fluoropolymer forming the flexible fluoropolymer body being substantially conductive throughout or over all the structure of the flexible body, or a conductive fluoropolymer segment around the perimeter of a non-conductive flexible fluoropolymer body forming a flexible fluoropolymer body with a conductive composite fluoropolymer perimeter segment throughout or overall the structure of the perimeter segment and a non-conductive fluoropolymer region within this perimeter segment.

Suitable fluoropolymers for the disclosed flexible fluoropolymer body of the diaphragm valve include, but are not limited to, perfluoroalkoxy alkane polymer (PFA), ethylene and tetrafluoroethylene polymer (ETFE), ethylene, tetrafluoroethylene and hexafluoropropylene polymer (EFEP), fluorinated ethylene propylene polymer (FEP), tetrafluoroethylene polymer (PTFE), or combinations thereof. In certain embodiments, a suitable polymer for the flexible fluoropolymer body of the diaphragm valve comprises tetrafluoroethylene polymer loaded with conductive material. In some of these embodiments, the flexible conductive body of the diaphragm valve mitigates electrostatic discharge in a flange segment of the diaphragm valve.

Certain embodiments of this disclosure are related to a diaphragm valve for a fluid circuit comprising two or more housing components each having a flange segment, one or more intake fitting, one or more output fitting, a diaphragm, and a gasket; wherein the gasket comprises a conductive fluoropolymer to transfer static charge from the diaphragm valve to ground. In selected embodiments, the diaphragm comprises a flexible fluoropolymer body that is in conductive contact with the gasket.

Suitable fluoropolymers for the disclosed gasket include, but are not limited to, perfluoroalkoxy alkane polymer (PFA), ethylene and tetrafluoroethylene polymer (ETFE), ethylene, tetrafluoroethylene and hexafluoropropylene polymer (EFEP), fluorinated ethylene propylene polymer (FEP), tetrafluoroethylene polymer PTFE), or combinations thereof. In certain embodiments, the gasket comprises tetrafluoroethylene polymer loaded with conductive material. In some of these embodiments, the gasket mitigates electrostatic discharge in a flange segment of the diaphragm valve.

In some embodiments, the disclosed gasket comprises perfluorinated ionomer particles that are blended with a non-conductive fluoropolymer to form a composite including a non-conductive fluoropolymer matrix and regions of perfluorinated ionomer distributed within the non-conductive fluoropolymer matrix. The regions of perfluorinated ionomer within the non-conductive fluoropolymer matrix impart electrostatic dissipative properties to the resultant composite. An example of a suitable perfluorinated ionomer is a perfluorosulfonic acid (PFSA) polymer having a poly (tetrafluoroethylene) backbone with perfluoroether pendant side chains terminated by sulfonic acid groups is commercially available NAFION™ ionomer (NAFION™ is a trademark of The Chemours Company). Additional examples of commercially available perfluorinated ionomers include, but are not limited to, FLEMION® (Asahi Glass Company), ACIPLEX® (Asahi Kasei), or FUMION® F. (FuMA-Tech) ionomers. Perfluorinated ionomers for use in electrostatic dissipative systems are reported in U.S. Pub. No. US 2020/0103056 A1.

One or more embodiments of this disclosure are also related to fluid circuit with integrated electrostatic discharge mitigation comprising a grounded operative component, diaphragm valve, or a gasket of any of the embodiments described above.

Further, One or more embodiments of this disclosure are related to a method of making a fluid circuit with an integrated electrostatic discharge mitigation system comprising installing an operative component, diaphragm valve, or gasket of any of the embodiments described above in the fluid circuit, and grounding the operative component, or diaphragm valve or gasket.

The above summary is not intended to describe each illustrated embodiment or every implementation of the present disclosure.

BRIEF DESCRIPTION OF THE DRAWINGS

The drawings included in this disclosure illustrate embodiments of the present disclosure and, along with the description, serve to explain the principles of the disclosure. The drawings are only illustrative of certain embodiments and do not limit the disclosure.

Figure 1:
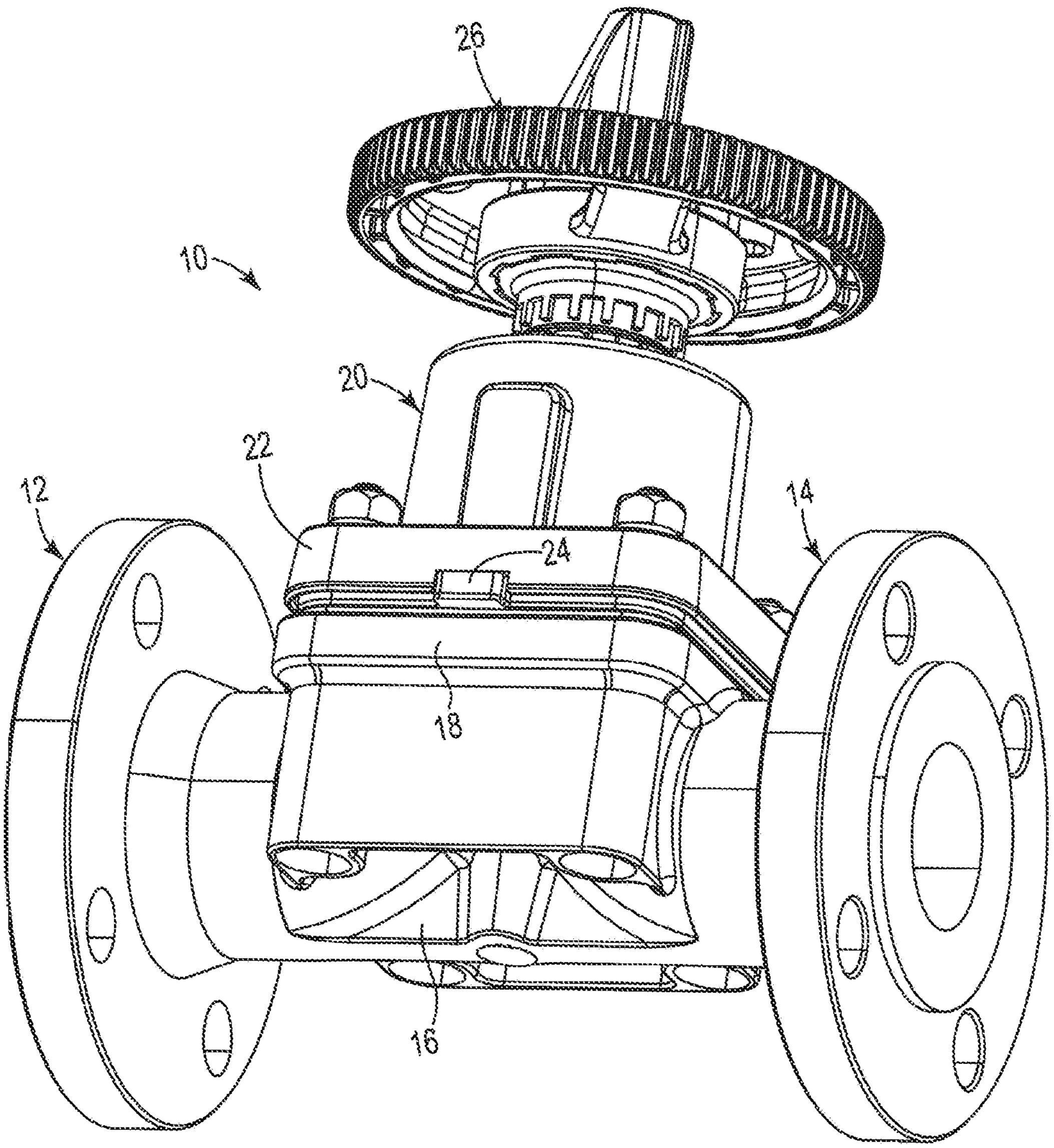
FIG. 1 depicts an isometric view of a diaphragm valve, according to one or more embodiments of this disclosure.

The embodiments of this disclosure are amenable to various modifications and alternative forms, and certain specifies have been shown, for example, in the drawings and will be described in detail. It is understood that the intention is not to limit the disclosure to the particular embodiments described; the intention is to cover all modifications, equivalents, and alternatives falling within the spirit and scope of this disclosure.

DETAILED DESCRIPTION

This disclosure reports embodiments of an operative component or a diaphragm valve for applications in a fluid handling system with ESD mitigation having a fluid flow passageway from a fluid supply to one or more downstream process stages. Conventional and some ESD mitigation fluid circuits are reported, for example, in International patent application. WO 2017/210293, which is incorporated herein by reference, except for express definitions or patent claims contained therein. Other ESD mitigation fluid circuits are reported, for example, in an Entegris brochure, FLUORO-LINE Electrostatic (ESD) Tubing, 2015-2017.

FIG. 1 is an isometric view that illustrates an embodiment of a diaphragm valve 10. The diaphragm valve 10 includes an inlet fitting 12 and an outlet fitting 14. The inlet valve 12 and outlet valve 14 are connected to a first housing component 16 having a first flange segment 18. The diaphragm valve further includes a second housing component 20 having a second flange 22. The first flange 18 and second flange 22 are configured to provide a leak proof connection when the diaphragm valve is used in a fluid circuit to control fluid flow between the inlet fitting 12 and the outlet fitting 14. FIG. 1 also illustrates a ground tab 24 that is in conductive contact with a diaphragm comprising a flexible fluoropolymer body (not shown) within the internal portions of the first housing component 16 and second housing component 20. Ground tab 24 allows transfer of static charge when connected to ground. FIG. 1 also illustrates an external portion of an actuator 26 that provides both internal and external structure to adjust or control the position of the flexible fluoropolymer body (not shown) in the internal portion of the diaphragm valve. The position of the flexible fluoropolymer body controls fluid flow from the inlet fitting to the outlet fitting.

Figure 2:
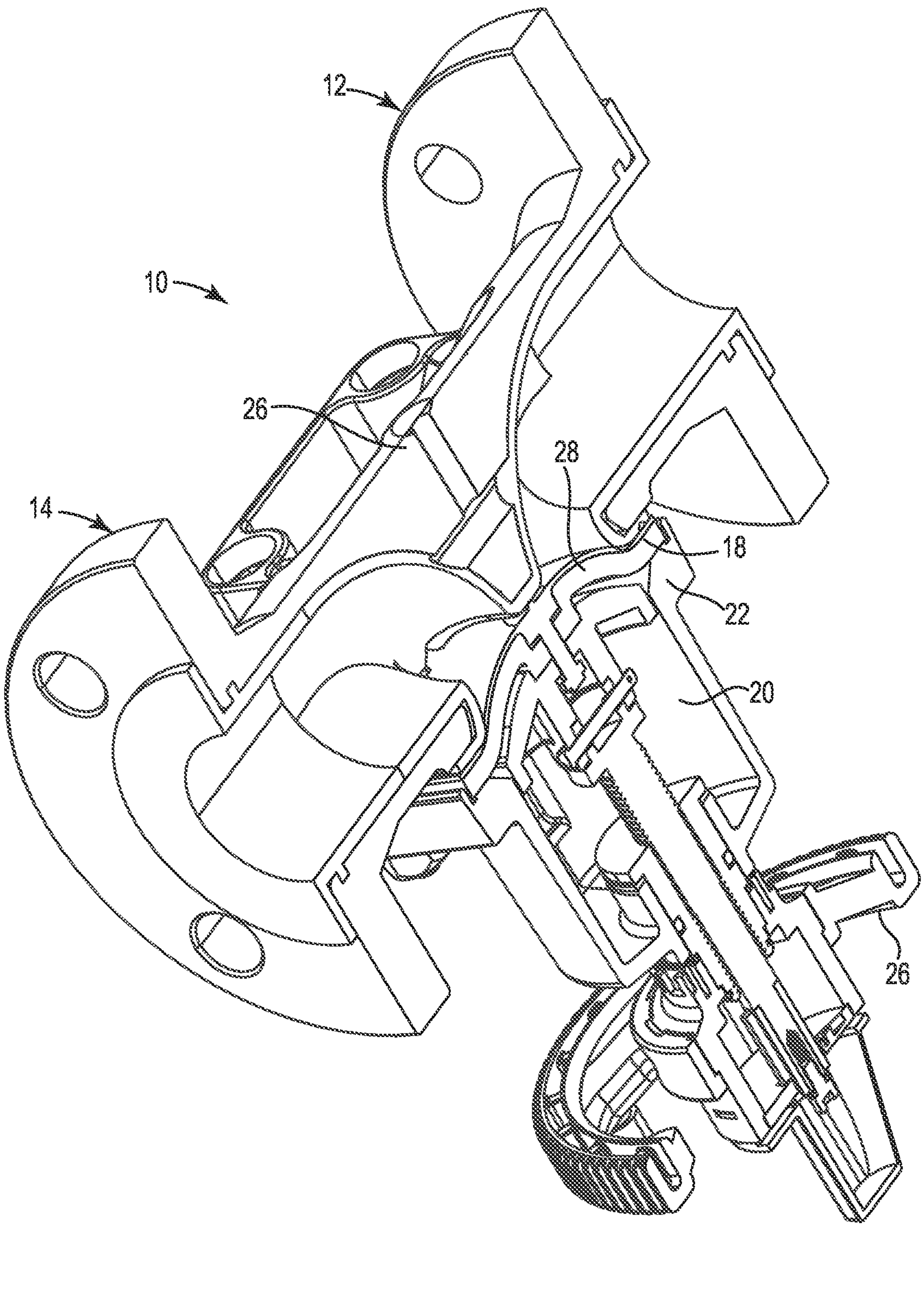
FIG. 2 depicts a cross section view of a diaphragm valve, according to one or more embodiments of this disclosure.

FIG. 2 is a cut away view that illustrates the internal portions of the diaphragm valve 10. FIG. 2 illustrates all of the external portions of the diaphragm valve including inlet fitting 10, outlet fitting 12 first housing component 16, first flange segment 18, second housing component 20, second flange segment 22 and external portion of actuator 26. FIG. 2 further illustrates the cut away portion of the flexible fluoropolymer body. Flexible fluoropolymer body 28 is configured to be attached diaphragm valve 10 between the first flange segment 18 and second flange segment 22. When the diaphragm valve 10 is used in a fluid circuit the flexible fluoropolymer body provides an external structure allowing for a conductive path between the internal and external structure of the diaphragm valve 10. The external structure of the flexible fluoropolymer body may be connected to ground to provide electrostatic mitigation of charge that may be generated by fluid flow in the internal regions of a fluid circuit.

Figure 3:
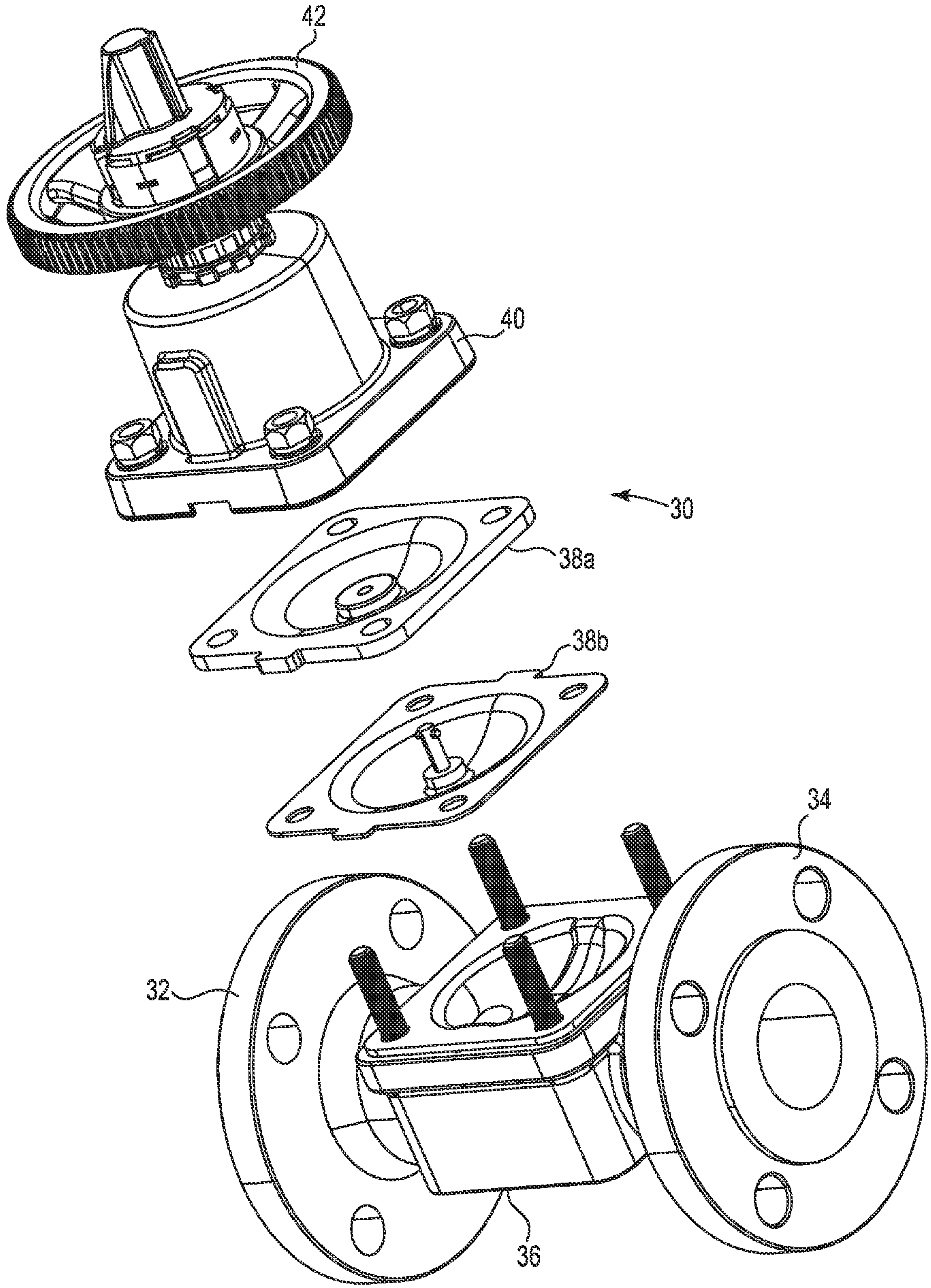
FIG. 3 depicts an exploded view of a diaphragm valve, according to one or more embodiments of this disclosure.

FIG. 3 is an exploded view that illustrates the principle structure of an embodiment of a diaphragm valve 30. The structure includes an inlet fitting, 32, an outlet fitting 34 and first housing component 36. FIG. 3 further illustrates a flexible fluoropolymer body 38*a* and 38*b* configured to be attached between first housing component 36 and second housing component 40. Second housing component 40 also includes the external portion of an actuator 42.

Figure 4:
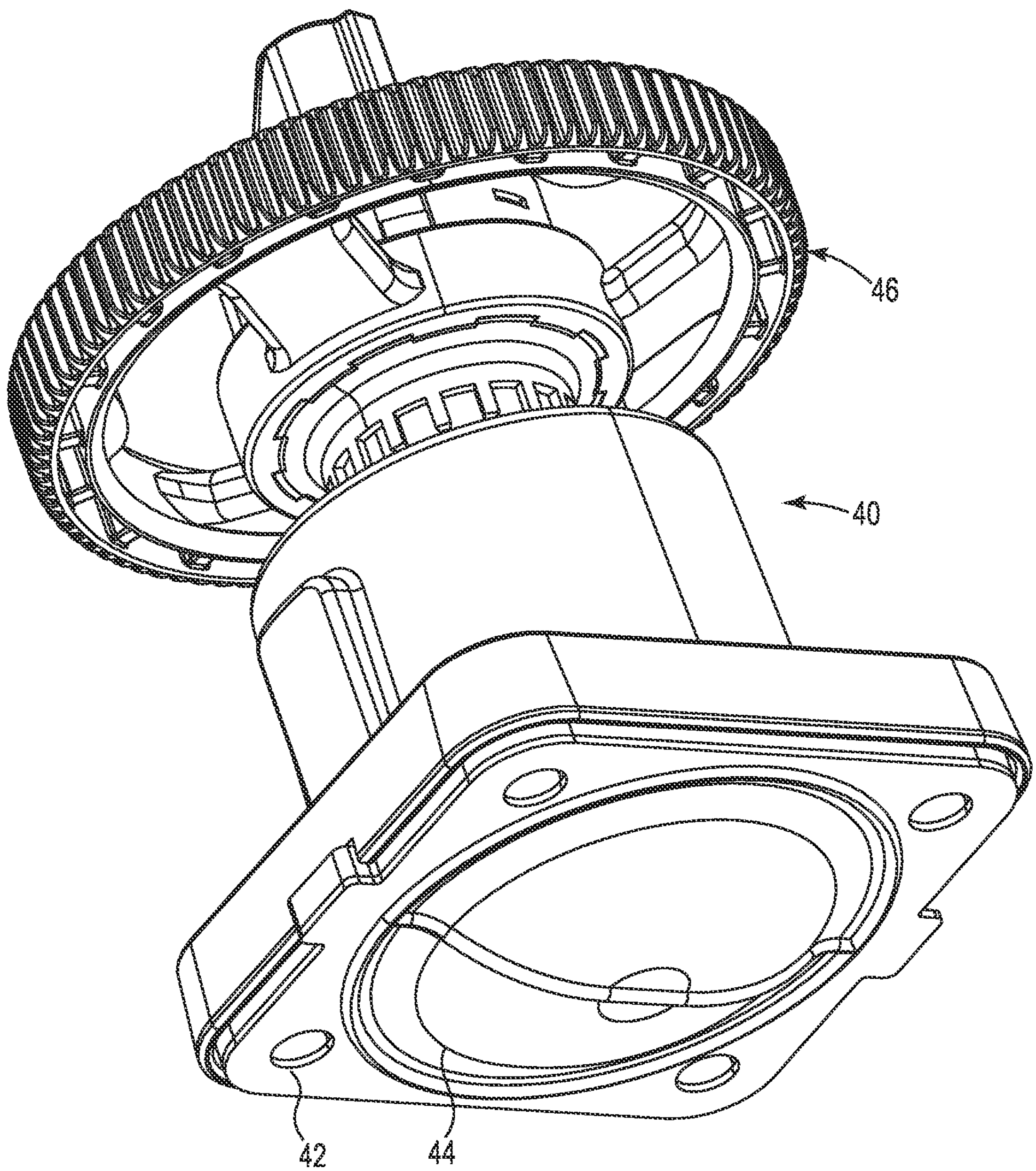
FIG. 4 depicts an isometric view of a diaphragm valve actuator, according to one or more embodiments of this disclosure.

FIG. 4 is an isometric view of housing component 40 including a flange segment 42, a flexible fluoropolymer body 44, and external portion of an actuator 46. The combination of the flexible fluoropolymer body and external portion of the actuator 46 allows control of fluid in an assembled diaphragm valve by adjusting or controlling the position of the flexible fluoropolymer body.

Figure 5:
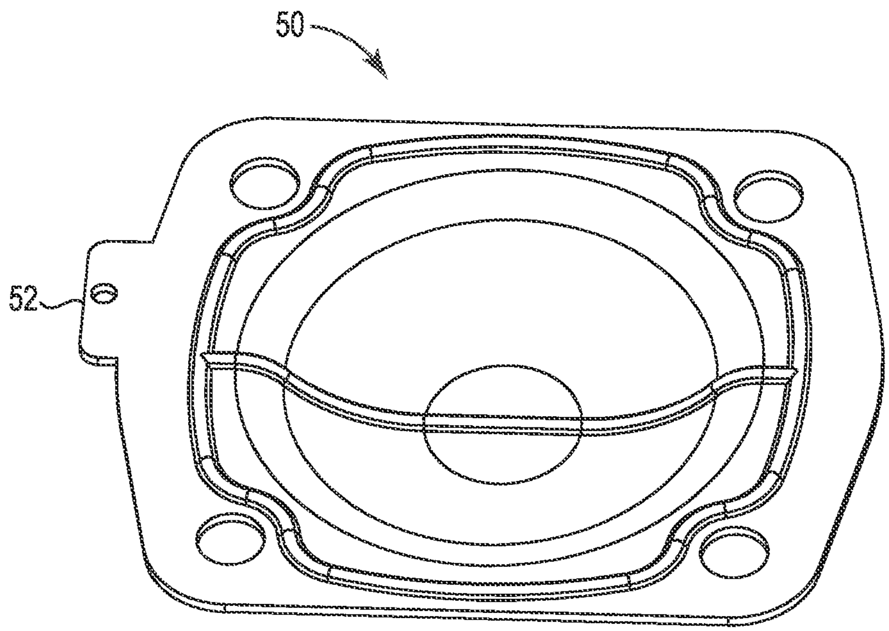
FIG. 5 depicts a digital image of an embodiment of a flexible fluoropolymer body of a diaphragm valve, according to one or more embodiments of this disclosure.
Figure 6:
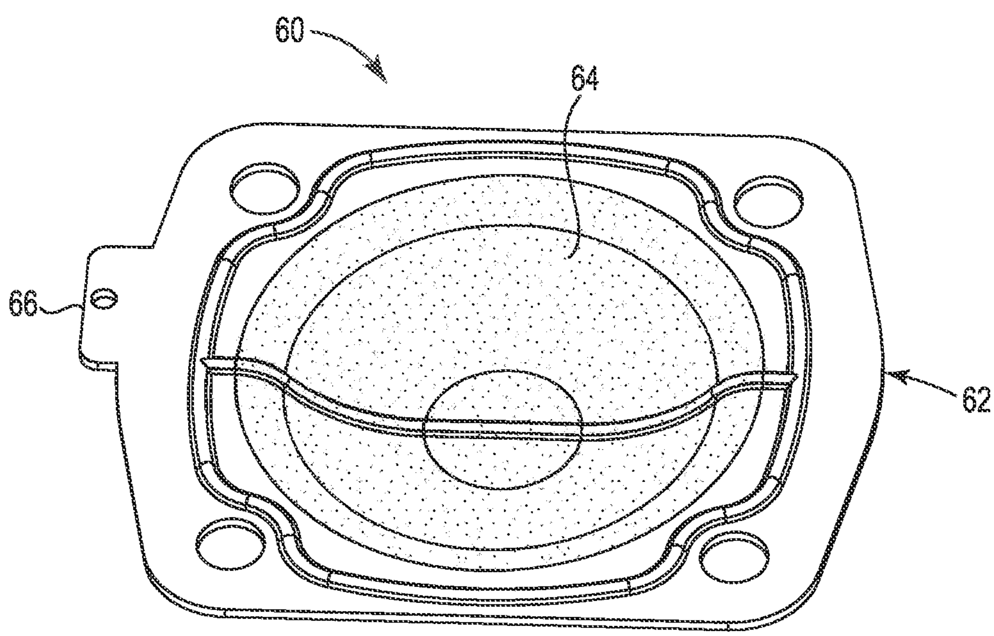
FIG. 6 depicts a digital image of another embodiment of a flexible fluoropolymer body of a diaphragm valve, according to one or more embodiments of this disclosure.

FIG. 5 illustrates an embodiment of a diaphragm or flexible fluoropolymer body 50. In this embodiment the flexible fluoropolymer body comprises a conductive fluoropolymer that is molded into a predetermined shape using a selected conductive fluoropolymer to provide an essentially uniform polymeric structure in the molded flexible fluoropolymer body. The conductive fluoropolymer includes a tab 52 which extends to the external portion of an assemble diaphragm valve. When tab 52 is grounded, the conductive fluoropolymer provides a conductive pathway to mitigate static charge that may be generated by fluid flow in the internal portion of the diaphragm valve and fluid flow through a fluid circuit FIG. 6 illustrates an embodiment of a diaphragm or flexible fluoropolymer body 60. In this embodiment the flexible fluoropolymer body comprises a conductive fluoropolymer 62 on the perimeter of the flexible fluoropolymer body 60 and a non-conductive fluoropolymer 64 within the internal region of the flexible fluoropolymer body. Flexible fluoropolymer body 60 is molded into a predetermined shape using a selected conductive fluoropolymer and a selected non-conductive fluoropolymer to provide the molded flexible fluoropolymer body 60 having a conductive perimeter portion and a non-conductive internal region. The conductive fluoropolymer perimeter portion includes a tab 66 which extends to the external portion of an assemble diaphragm valve. When tab 66 is grounded, the conductive fluoropolymer perimeter portion provides a conductive pathway to mitigate static charge that may be generated by fluid flow in the internal portion of the diaphragm valve and fluid flow through a fluid circuit.

Figure 7:
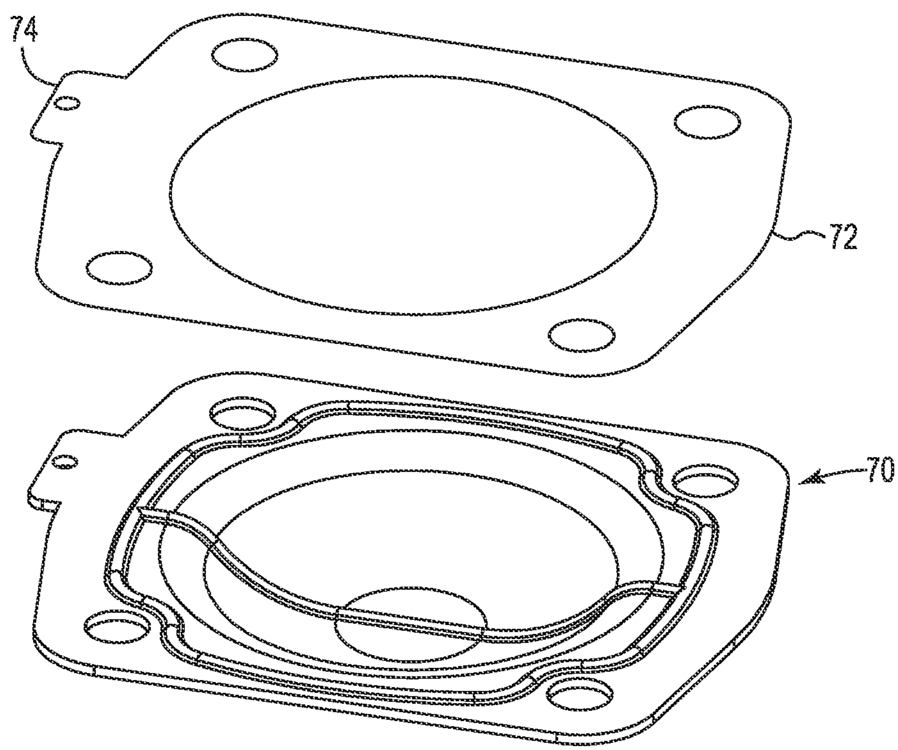
FIG. 7 depicts still another digital image of an embodiment of a flexible fluoropolymer body of a diaphragm valve, according to one or more embodiments of this disclosure.

FIG. 7 illustrates an embodiment of a diaphragm or flexible fluoropolymer body 70 and a conductive fluoropolymer gasket 72. In this embodiment the flexible fluoropolymer body comprises a non-conductive fluoropolymer body 70. Similarly, conductive fluoropolymer gasket 72 is molded to a predetermined shape using a selected conductive fluoropolymer. The shape of the gasket 72 is configured to correspond to the shape of the perimeter of the flexible fluoropolymer body 70 and the flange segments of a diaphragm valve having a first housing component and second housing component as illustrated, for example, in FIG. 3. The conductive fluoropolymer gasket includes a tab 74 which extends to the external portion of an assemble diaphragm valve. When tab 74 is grounded, the conductive fluoropolymer provides a conductive pathway to mitigate static charge that may be generated by fluid flow in the internal portion of the diaphragm valve and fluid flow through a fluid circuit Operative components and diaphragm valves in this disclosure refer to any component or device having a fluid input and a fluid output and that connect with tubing for directing or providing for the flow of fluid. Related and additional components of fluid control systems are illustrated, for example, in U.S. Pat. Nos. 5,672,832; 5,678,435; 5,869,766; 6,412,832; 6,601,879; 6,595,240; 6,612,175; 6,652,008; 6,758,104; 6,789,781; 7,063,304; 7,308,932; 7,383,967; 8,561,855; 8,689,817; and 8,726,935, each of which are incorporated herein by reference, except for express definitions or patent claims contained in the listed documents.

The fluid control components if this disclosure, such as, for example, a diaphragm comprising a fluoropolymer, may be constructed from conductive and/or non-conductive fluoropolymers including, for example, perfluoroalkoxy alkane polymer (PFA), ethylene and tetrafluoroethylene polymer (ETFE), ethylene, tetrafluoroethylene and hexafluoropropylene polymer (EFEP), fluorinated ethylene propylene polymer (FEP), tetrafluoroethylene p[polymer PTFE), or other suitable polymeric materials. For example, in some embodiments the conductive fluoropolymers may be loaded with conductive material (e.g. a loaded fluoropolymer). This loaded fluoropolymer includes, but is not limited to, a fluoropolymer loaded with carbon fiber, nickel coated graphite, carbon fiber, carbon powder, carbon nanotubes, metal particles, and steel fiber.

Alternatively, the fluid control components if this disclosure, such as, for example, a diaphragm may be constructed from perfluorinated ionomer particles that are blended with a non-conductive fluoropolymer to form a composite including a non-conductive fluoropolymer matrix and regions of perfluorinated ionomer distributed within the non-conductive fluoropolymer matrix as described above in this disclosure.

In various embodiments, conductive materials have a resistivity level less than about $1\times10^{10}$ ohm-m while non-conductive materials have a resistivity level greater than about $1\times10^{10}$ ohm-m. In certain embodiments, conductive materials have a resistivity level less than about $1\times10^{9}$ ohm-m while non-conductive materials have a resistivity level greater than about $1\times10^{9}$ ohm-m. When the disclosed fluid handling systems are configured for use in ultra-pure fluid handling applications, the fluid control components may be constructed from polymeric materials to satisfy purity and corrosion resistance standards.

The various additional elements of the operative components and diaphragm valves of this disclosure, in addition to the flexible fluoropolymer body described above, may be constructed from materials including metals, polymeric materials, or loaded polymeric materials. Generally loaded polymeric materials of selected structural elements of the operative components and diaphragm valves may include a polymer that is loaded with steel wire, aluminum flakes, nickel coated graphite, carbon fiber, carbon powder, carbon nanotubes, or other conductive material. In some instances, these elements may have a main portion constructed from non-conductive or low conductive material, such as constructed from various hydrocarbon and non-hydrocarbon polymers such as, but are not limited to, polyesters, polycarbonates, polyamides, polyimides, polyurethanes, polyolefins, polystyrenes, polyesters, polycarbonates, polyketones, polyureas, polyvinyl resins, polyacrylates, polymethylacrylates and fluoropolymers. Exemplary fluoropolymers include, but are not limited to, perfluoroalkoxy alkane polymer (PFA), ethylene tetrafluoroethylene polymer (ETFE), ethylene, tetrafluoroethylene and hexafluoropropylene polymer (EFEP), fluorinated ethylene propylene polymer (FEP), and tetrafluoroethylene polymer (PTFE), or other suitable polymeric materials, and having, for example, a secondary co-extruded conductive portion.

Figure 8:
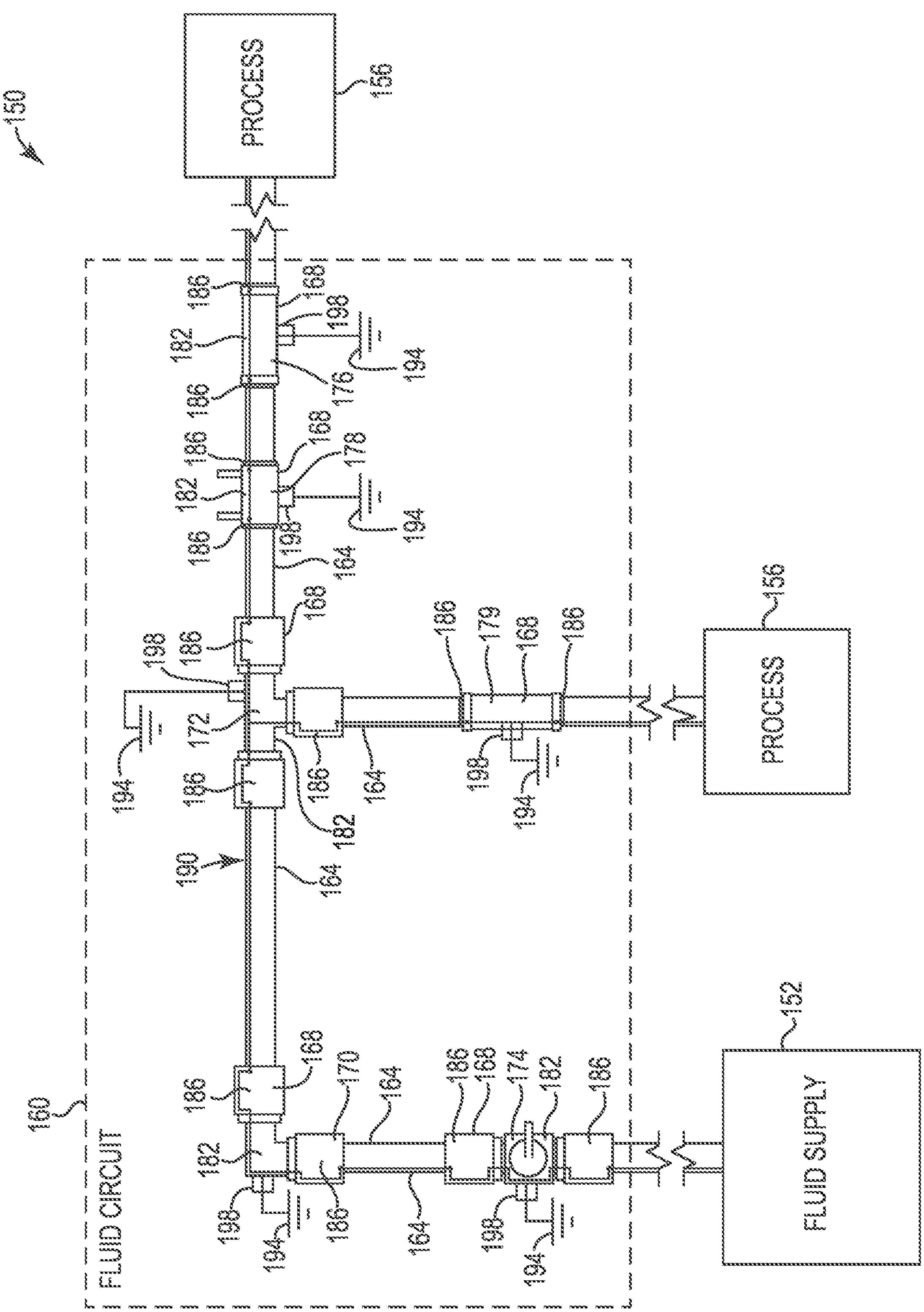
FIG. 8 depicts a schematic view of a fluid control circuit comprising an operative component, according to one or more embodiments of this disclosure.

The operative components and diaphragm valves of this disclosure are suitable for use in fluid circuits having electrostatic mitigation systems. FIG. 8 is a schematic diagram of an exemplary fluid handling system 150. The fluid handling system 150 provides a flow path for fluid to flow from a fluid supply 152 to one or more process stages 156 positioned downstream of the source of fluid supply. Fluid handling system 150 includes a fluid circuit 160 which includes a portion of the flow path of the fluid handling circuit 150. The fluid circuit 160 includes tubing segments 164 and a plurality of operative components 168 that are interconnected via the tubing segments 164. In FIG. 8, the operative components 168 include an elbow shaped fitting 170, T-shaped fitting 172, a valve 174, filter 176, flow sensor 178, and straight fitting 179. However, in various embodiments the fluid circuit 160 can include additional or fewer operative components in number and in type. For example, the fluid circuit 160 could substitute or additionally include pumps, mixers, dispense heads, sprayer nozzles, pressure regulators, flow controllers, or other types of operational components. In assembly, the operative components 168 are connected together by the plurality of tubing segments 164 connecting to the components 168 at their respective tubing connector fittings 186. Connected together, the plurality of tubing segments 164 and operative components 168 provide a fluid passageway through the fluid circuit 160 from the fluid supply 152 and toward the process stages 156.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An operative component for a fluid circuit:

comprising a housing having i) one or more fluid intake fitting, ii) one or more fluid output fitting, and iii) one or more fluid control components configured to transfer static charge from the fluid control component to ground, wherein the one or more fluid control components comprise a diaphragm valve for controlling fluid flow from the intake fitting to the output fitting and a gasket positioned on the diaphragm valve, wherein the gasket comprises a conductive fluoropolymer to transfer static charge from the diaphragm valve to ground, wherein the diaphragm valve includes a flexible fluoropolymer body to control fluid flow from the intake fitting to the output fitting, wherein the flexible fluoropolymer body includes a conductive perimeter portion directly connected to and at least partially surrounding a perimeter of a non-conductive internal region, and wherein the gasket is configured to correspond to the shape of a conductive perimeter portion.

2. The operative component of claim 1, wherein the conductive fluoropolymer segment is in conductive contact with the non-conductive flexible fluoropolymer body.

3. The operative component of claim 1, wherein the conductive fluoropolymer comprises tetrafluoroethylene polymer loaded with conductive material.

4. A diaphragm valve for a fluid circuit comprising two or more housing components, one or more intake fitting, one or more output fitting, and a diaphragm, wherein the diaphragm comprises a flexible conductive fluoropolymer body to transfer static charge from the diaphragm to ground;

wherein the flexible conductive fluoropolymer body comprises a conductive fluoropolymer segment around a perimeter of a non-conductive flexible fluoropolymer body;

and a gasket positioned on the diaphragm, wherein the gasket comprises a conductive fluoropolymer to ground, wherein the diaphragm includes a conductive perimeter portion directly connected to and at least partially surrounding a perimeter of a non-conductive internal region, and wherein the gasket is configured to correspond to the shape of a conductive perimeter portion.

5. The diaphragm valve of claim 4, wherein the conductive fluoropolymer segment is in conductive contact with the non-conductive flexible fluoropolymer body.

6. The diaphragm valve of claim 4, wherein the conductive fluoropolymer segment comprises perfluoroalkoxy alkane polymer (PFA), ethylene and tetrafluoroethylene polymer (ETFE), ethylene, tetrafluoroethylene and hexafluoropropylene polymer (EFEP), fluorinated ethylene propylene polymer (FEP), tetrafluoroethylene polymer (PTFE), or combinations thereof.

7. The diaphragm valve of claim 4, wherein the conductive fluoropolymer segment mitigates electrostatic discharge in a flange segment of the diaphragm valve.

8. The diaphragm valve of claim 4, wherein the gasket comprises tetrafluoroethylene polymer loaded with conductive material.

9. A method of making a fluid circuit with an integrated electrostatic discharge mitigation system comprising installing an operative component of claim 4 in the fluid circuit and grounding the operative component.

* * * * *